(12) United States Patent
Salati Chiodini et al.

(10) Patent No.: US 11,357,236 B2
(45) Date of Patent: Jun. 14, 2022

(54) MACHINE FOR MAKING RISSOLES

(71) Applicant: MINERVA OMEGA GROUP S.R.L., Bologna (IT)

(72) Inventors: Daniele Salati Chiodini, Bologna (IT); Andrea Salati Chiodini, Bologna (IT)

(73) Assignee: MINERVA OMEGA GROUP S.R.L.

(*) Notice: Subject to any disclaimer, the term of this patent is extended or adjusted under 35 U.S.C. 154(b) by 0 days.

(21) Appl. No.: 17/257,564

(22) PCT Filed: Jul. 4, 2019

(86) PCT No.: PCT/EP2019/068051
§ 371 (c)(1),
(2) Date: Jan. 1, 2021

(87) PCT Pub. No.: WO2020/008014
PCT Pub. Date: Jan. 9, 2020

(65) Prior Publication Data
US 2021/0282415 A1     Sep. 16, 2021

(30) Foreign Application Priority Data
Jul. 4, 2018  (IT) .......................  102018000006923

(51) Int. Cl.
*A22C 7/00*      (2006.01)
*A23P 30/10*     (2016.01)
*A23P 30/20*     (2016.01)

(52) U.S. Cl.
CPC ............ *A22C 7/0015* (2013.01); *A23P 30/10* (2016.08); *A23P 30/20* (2016.08)

(58) Field of Classification Search
CPC ......... A22C 7/0015; A23P 30/10; A23P 30/20
See application file for complete search history.

(56) References Cited

U.S. PATENT DOCUMENTS 3,002,220 A     10/1961  Rikhoff
3,713,187 A  *  1/1973  Quartarone .......... A22C 7/0015
                                                    426/513
(Continued)

FOREIGN PATENT DOCUMENTS

EP     0 133 856 A1    3/1985
EP     0 559 631 A1    9/1993
(Continued)

OTHER PUBLICATIONS

Bibliographic data, including English language abstract, Foreign Patent Document, Publication FR2806257A1, 2 pages.
(Continued)

*Primary Examiner* — Seyed Masoud Malekzadeh
(74) *Attorney, Agent, or Firm* — Ware, Fressola, Maguire & Barber LLP

(57) ABSTRACT

A machine for forming rissoles (2) has a hopper (3) for a food (4); a dispensing element (5) of at least a portion (6) of said food (4) taken from the hopper (3); a forming element (10) of each portion (6) having a shaped element (11) and a facing contrast element (12). The shaped element (11) includes a motor roller (13) provided with a pair of circumferential grooves (14) and the contrast element (12) includes a fixed guide (15) provided with two grooves (16) facing the recesses (14). Each recess (14) and each groove (16) form a channel (21) and internally have respectively a series of reliefs or notches (22) and a series of protrusions or cavities (23). The reliefs or notches (22) and the protrusions or cavities (23) interact with each portion (6) to help rototranslational movement thereof within the channel (21) to form a spherical shaped rissole (2).

12 Claims, 2 Drawing Sheets

(56) References Cited

U.S. PATENT DOCUMENTS

| | | | |
|---|---|---|---|
| 4,187,582 A | | 2/1980 | DiLoreto |
| 4,712,272 A | * | 12/1987 | Soodalter ............... A21C 11/00 425/360 |
| 5,402,711 A | | 4/1995 | van der Cruyssen |
| 9,918,482 B1 | | 3/2018 | Xie |

FOREIGN PATENT DOCUMENTS

| | | |
|---|---|---|
| FR | 2 806 257 A1 | 9/2001 |
| GB | 541188 A | 11/1941 |

OTHER PUBLICATIONS

Bibliographic data, including English language abstract, Foreign Patent Document, Publication EP133856A1, 2 pages.
International Search Report and Written Opinion of the International Search Authority (ISA/EP), dated Sep. 30, 2019, International Application No. PCT/EP2019/068051, 13 pages.

* cited by examiner

MACHINE FOR MAKING RISSOLES

TECHNICAL FIELD

The present invention relates to technical field concerning food preparation machines and refers in particular to a machine for making rissoles.

BACKGROUND ART

There are known machines for making rissoles that essentially consist of a hopper for containing food (for example, meat, fish, vegetables, mixed kneading, biscuit mixture, etc.) which comes out in a controlled manner from the dispensing mouth towards a rotating cylinder provided with peripheral throats to which corresponding arched grooves are faced.

Between a cylinder throat and the corresponding guide groove, a cylindrical channel is defined within which each food roll is inserted, which is transformed into a corresponding food ball by virtue of the roller rotation with respect to the fixed arched guide.

U.S. Pat. No. 3,002,220 describes a meatball maker in which a food cube falls from a hopper onto a belt with a semi-circular section groove looped around two rollers. In correspondence of a roller, the belt is opposite to a forming means with a throat having a semicircular section fit to define with the belt groove a cylindrical channel into which the food cube enters and exits with an almost spherical shape. This spherical rissole then falls by gravity into an underlying container.

The disadvantage of this meat ball maker lies both in the enormous bulk of the closed loop belt and in the absence of a formed rissoles automatic evacuator. In addition, the hopper contains only food cubes.

Patent application EP 0 559 631 A1 describes an elastic swing arm machine for making balls of kneaded material which has further downstream apparatus having a peripheral groove disk and a peripheral throat abutment partially facing the disk groove so as to create a cylindrical channel section within which the rissole passes to be further formed and rounded.

The drawback of this embodiment is the complexity of the machine that involves a considerable bulkiness, as it practically comprises two machines in cascade.

The U.S. Pat. No. 9,918,482 describes a machine for making ball-shaped food by means of the prior formation of a flattened dough bulk which is sectioned into small pieces intended to pass between the throats of two counter-rotating opposed rollers so as to deform them into balls.

This bulky machine is intended for processing soft dough foods to make small portions with an imprecise, almost spherical, and non-constant shape since the plastic deformation of each piece of flattened bulk is made in that instant passage alone, at the only approaching point between the two counter-rotating rollers.

The patent GB 541,188 describes an apparatus for making balls of minced meat by passing the minced meat between grooved rollers which may rotate in opposite directions, or in the same direction but at different surface speeds, or one roller only may rotate while the other remains stationary.

Even with this machine, the obtained balls are not well formed as spheres because of the soft food and their formation is almost instantaneous in the unique approaching point between the two forming rolls.

U.S. Pat. No. 4,187,582 describes a machine for making meatballs by extrusion from an orifice of meat dough which is sectioned into portions by a knife, each of which drops into an annular chamber defined by a semi-circular throat of a fixed abutment around its perimeter and a semi-circular groove of a cylindrical disk which rotates inside the fixed abutment or stop. The annular chamber provides an outlet opening opposite to the entrance, from which the almost spherical shaped meatball comes out.

The main disadvantage of said machine is that the disk is completely housed within the fixed cylindrical stop so that no portion of the circular chamber can be inspected. When the food dough is particularly soft or not very compact, any bits of food or whole portions of meatball can remain stuck to the disk semi-throat or to the fixed stop during the meatball formation in the long circular chamber. This implies the presence of ever-greater quantities of food outside the channel with respect to those desired with the consequent machine clogging and failure since the cleaning of the circular meatball-forming channel can only be achieved by extracting the disk from the fixed stop.

DISCLOSURE OF THE INVENTION

The main object of the present invention is to propose a machine for making rissoles of small size, extremely compact and able to produce a series of perfectly spherical shaped rissoles, of constant and homogeneous dimensions with any type of food dough.

Another object is to propose a machine that allows a reduced exposure to the food environment during the making of meatballs, avoiding accidental contact with the operators too.

Another object is to propose a machine for making rissoles of simple maintenance with reduced moving parts and avoiding the food detachment inside the formation channel of rissoles.

A further object is to propose an easily transportable rissoles machine and suitable for domestic environments too.

BRIEF DESCRIPTION OF THE DRAWINGS

The characteristics of the invention are highlighted below with particular reference to the accompanying drawings in which.

DETAILED DESCRIPTION OF AN EMBODIMENT

Figure 1:
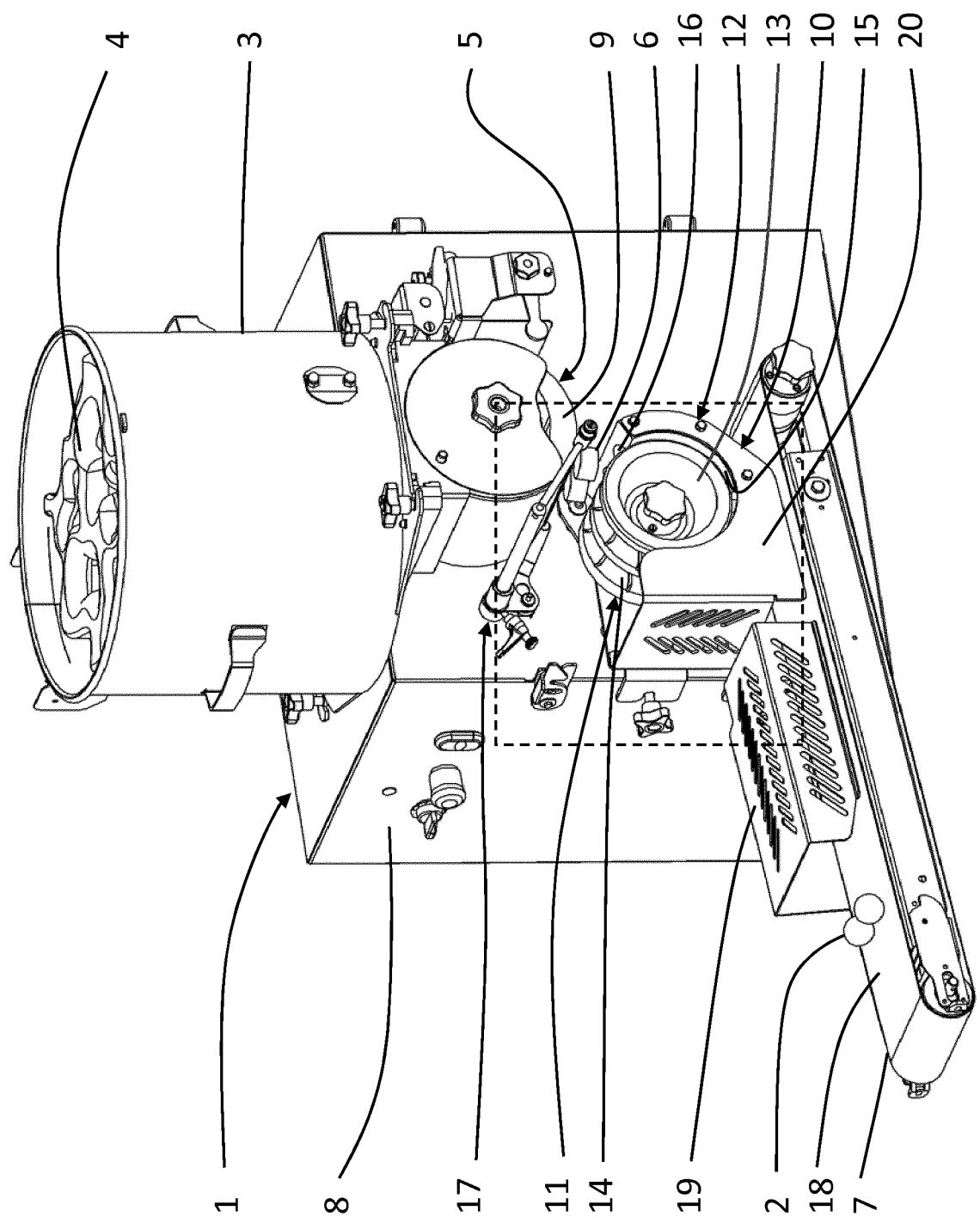
FIG. 1 shows a schematic axonometric view of the preferred embodiment of the machine for making rissoles according to one or more of the objects of the present invention.
Figure 2:
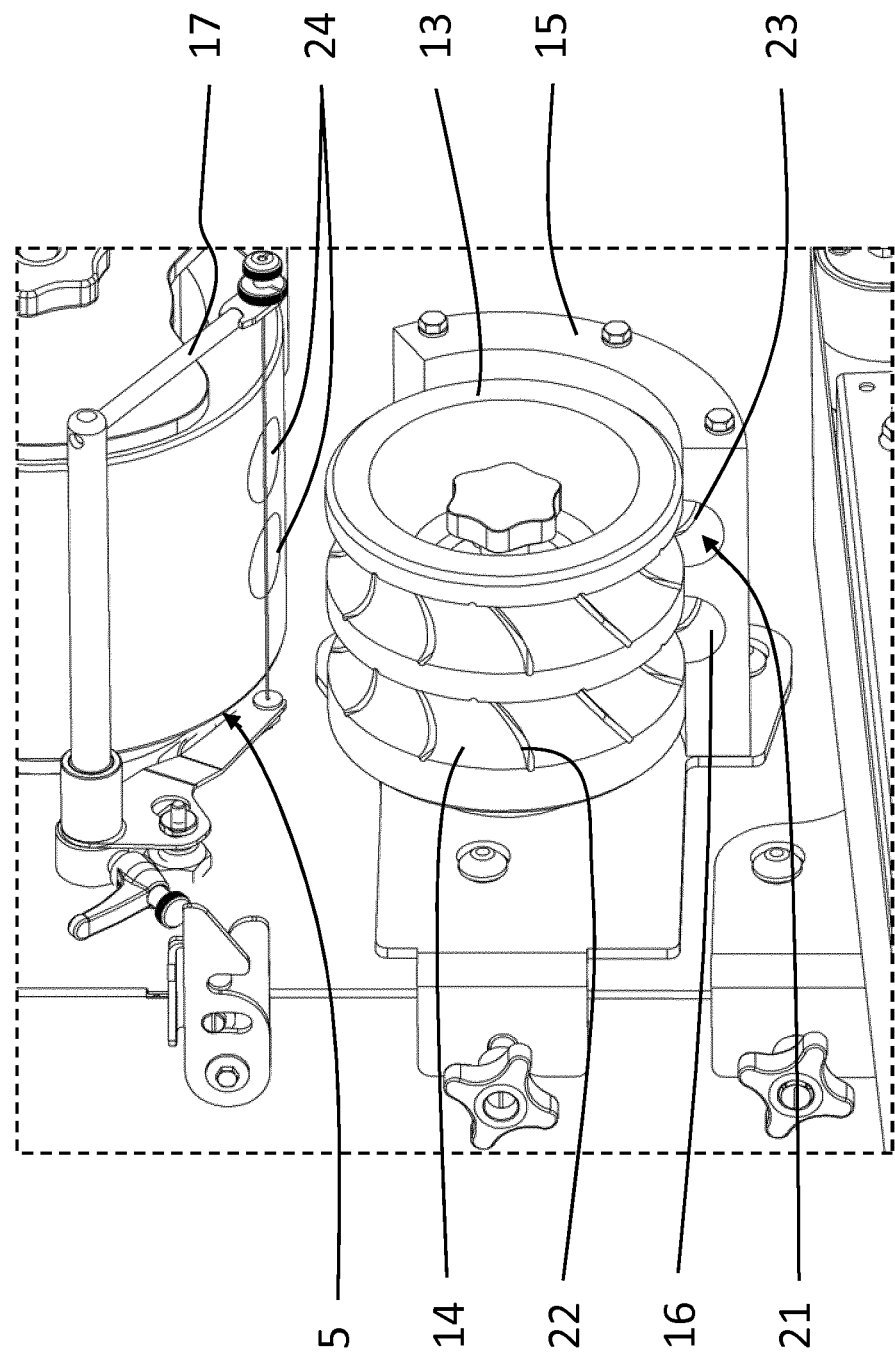
FIG. 2 shows an enlarged schematic axonometric view of a portion of the machine highlighted in FIG. 1, in which some parts are removed for better highlighting the others.

With reference to FIGS. 1 and 2, numeral 1 indicates the machine for making rissoles 2 object of the present invention. The machine 1 essentially comprises a frame 8 which supports a hopper 3 destined to contain a food 4 of the meat, fish, vegetables and biscuit type or mixtures of these food types either cut into pieces, or ground, or kneaded.

Below the hopper 3 there is a dispensing element 5 of portions 6 of the food 4 that is extracted from the hopper 3 itself. This dispensing element 5 is, for example, constituted by a rotating head 9 provided with niches, known and not shown, within each of which the food 4 is pressed when it comes out of the hopper 3 and which determines the formation of the relative food 4 portion 6.

In the preferred embodiment of the machine 1, the rotating head 9 is arranged below the outlet mouth of the hopper 3 and has a pair of bores 24 for extruding the food 4 from the hopper 3.

A separating element 17, of the wire-like arch type better shown in FIG. 2, is intended to detach from the dispensing element 5 the extruded food 4 through the bores 24 in the portions 6.

Under the dispensing element 5, a forming element 10 is positioned within which each portion 6 passes to be shaped like a rissole 2, preferably of an almost perfect spherical shape with any type of food 4, being it soft, hard, friable, sticky or kneaded.

The forming element or member 10 is partially surrounded by a second protection structure 20 acting as a box-shaped casing, open at the top, and it 20 is intended to avoid the interference of the machine 1 operators with the forming element 10 and/or with the rissoles 2.

The forming element 10 comprises a shaped element 11, consisting of a motor roller 13 provided with a pair of circumferential recesses 14, and a contrast element 12 facing the shaped element 11 and consisting of a fixed guide 15 provided with a pair of grooves 16 each of which faces the relative recess 14.

The shaped element 11 is cylindrical and has an external diameter that ranges between 75 mm and 200 mm, preferably is 147 mm.

The fixed guide 15 is curved with a central angle that ranges between 50° and 160°, preferably is 120°.

Each recess 14 with a semicircular section and each groove 16 with a semicircular section together define a channel 21 in which each portion 6 of food 4 passes to form the spherical rissole 2.

The recess 14 is internally provided with a plurality of reliefs or notches 22 (drawn in FIG. 2), in a variable number between 4 and 18, preferably 12 in the preferred embodiment, which are arranged obliquely or perpendicularly to the axis of the channel 21. The oblique, or in any case transversal, arrangement is preferred in order to create guides to facilitate the rotation of each portion 6 as it turns into a round rissole 2.

Likewise, the groove 16 is provided internally with a plurality of protrusions or cavities 23 (see FIG. 2) in a variable number between 2 and 8, preferably 4 in the preferred embodiment of the machine 1, which are arranged obliquely or perpendicularly to the axis of the channel 21. The oblique, or otherwise, transversal arrangement is preferred in order to create a lane or guide which, in cooperation and accordingly with the guide of recess 14, easily causes the roto-translation of each portion 6 while conforming into the relative spherical rissole 2.

Alternative embodiments of the machine 1 include the carrying out of the unique reliefs or notches 22 in the recess 14 without the protrusions or cavities 23 in the groove 16 and vice versa.

The operation of the machine 1, once loaded the hopper 3 with the desired food 4, provides the activation of the rotating head 9 and of the motor roller 13, so the food 4 is ejected from the hopper 3 through the pair of bores 24 and its detachment into two portions 6 by means of the separating element 17.

Each portion 6 then falls into the respective and corresponding channel 21, thus passing between the recess 14 and the relative facing groove 16. The rotation of the motor roller 13 causes the roto-translation of the portion 6 of food 4 so as to modify its shape from an almost cylindrical or diskette-like one to a nearly spherical one. The portion 6 of food 4 falls from the dispensing element 5 directly into the forming element 10 even with the cooperation of suitable known and not shown bulkheads.

Therefore, the forming element 10, located immediately below the dispensing element 5, allows each portion 6 to fall by gravity from the dispensing element 5 into the forming element 10, at a distance of less than 100 mm, determining the advantageous and enormous compactness of the machine 1.

The almost perfectly spherical shape of the rissole 2 is obtained by virtue of the reliefs or notches 22 and of the projections or cavities 23 which, cooperating, determine a "screw or spiral guide" within each channel 21 so that the portion 6 is forced to rotate as it moves due to the dragging motion of the portion 6 caused by the rotation of the motor roller 13.

At the exit from the forming element 10, each rissole 2 is transported by an evacuation element 7, located below the forming element itself, towards a known and not illustrated packaging station.

On the conveyor portion 18 of the evacuation element 7 there is a first protection structure 19, made as an elongated tunnel, intended to avoid the accidental falling of the rissoles 2 from the conveyor portion 18 or avoiding the contact with the operators of the machine 1.

Advantageously it should be pointed out that the reliefs or notches 22 and the protrusions or cavities 23 prevent the portions 6 or the meatballs 2 from releasing part of the food 4 of which they are composed within the channel 21, thus avoiding malfunctions or unwanted machine stops.

The invention claimed is:

1. Machine (1) for making rissoles comprising at least:
   a hopper (3) for food (4);
   a dispensing element (5) for dispensing a portion (6) of the food (4) taken from the hopper (3);
   a forming element (10) for forming the dispensed portion (6) comprising a shaped element (11) and a facing contrast element (12);
   the shaped element (11) comprising a motor roller (13) provided with a circumferential recess (14);
   the contrast element (12) comprising a fixed guide (15) provided with a circumferential groove (16) facing the circumferential recess (14), together defining a circumferential channel (21) into which the portion (6) passes;
   wherein the circumferential recess (14) includes reliefs or notches (22) in its interior and the groove (16) includes protrusions or cavities (23), the reliefs or notches (22) and the protrusions or cavities (23) for interacting with the portion (6) to facilitate a roto-translation movement of the portion (6) within the circumferential channel (21) so as to form the portion (6) into a spherically shaped rissole (2).

2. The machine according to claim 1, wherein the reliefs or notches (22) and the protrusions or cavities (23) are arranged obliquely or perpendicularly to a circumferential axis of the circumferential channel (21).

3. The machine according to claim 1, wherein the motor roller (13) has two circumferential recesses (14) on an outer surface of the motor roller (13) and the fixed guide (15) has two circumferential grooves (16) each facing a corresponding circumferential recess (14) of the motor roller (13).

4. The machine according to claim 1, wherein the shaped element (11) is cylindrical and has an external diameter between 75 mm and 200 mm.

5. The machine according to claim 1, wherein the contrast element (12) consists of at least one curved fixed guide (15)

with an angular extent about a center of the motor roller that ranges between 50° and 160°.

6. The machine according to claim 1, wherein the forming element (10) is placed immediately below the dispensing element (5), allowing the portion (6) to fall by gravity from the dispensing element (5) within the forming element (10), at a distance of less than 100 mm, thereby determining a certain compactness of the machine (1).

7. The machine according to claim 1, wherein the dispensing element (5) comprises:
- a rotating head (9) located below an outlet of the hopper (3) and having a bore (24) for extrusion of the food (4) from the hopper (3); and
- a separating element (17) for detaching the food (4) extruded from the hopper (3) into the portion (6).

8. The machine according to claim 1, wherein the forming element (10) is partially surrounded by a second protection (20) for avoiding interference of machine (1) operators with the forming element (10) or with the spherically shaped rissole (2).

9. The machine according to claim 1, wherein an evacuation element (7) is placed under the forming element (10) to evacuate the spherically shaped rissole (2).

10. The machine according to claim 9 wherein at least on a conveyor portion (18) of the evacuation element (7) a first protection structure (19) is arranged to avoid an accidental falling of the spherically shaped rissole (2) from the conveyor portion (18) or to avoid contact of the spherically shaped rissole (2) with an operator of the machine (1), or to avoid both.

11. The machine according to claim 1, wherein the shaped element (11) is cylindrical and has an external diameter of 147 mm.

12. The machine according to claim 1, wherein the contrast element (12) consists of at least one curved fixed guide (15) with an angular extent about a center of the motor roller of 120°.

* * * * *